United States Patent [19]

Reid et al.

[11] 3,977,376

[45] Aug. 31, 1976

[54] DIESEL ENGINE INTAKE AIR PREHEATER FUEL CONTROL

[75] Inventors: David L. Reid; Patrick F. Flynn; Walter Wayne Eberhard, all of Columbus, Ind.

[73] Assignee: Cummins Engine Company, Inc., Columbus, Ind.

[22] Filed: Nov. 14, 1974

[21] Appl. No.: 523,719

[52] U.S. Cl. .................... 123/122 G; 123/179 H; 123/142.5 R
[51] Int. Cl.² .................................... F02M 31/00
[58] Field of Search ......... 123/122 G, 142.5, 179 H; 60/39.28 R

[56] References Cited
UNITED STATES PATENTS

| | | | |
|---|---|---|---|
| 1,064,086 | 6/1913 | Porter et al. | 123/122 G |
| 3,197,958 | 8/1965 | Davies | 60/39.28 R |
| 3,397,684 | 8/1968 | Scherenberg | 123/142.5 R |
| 3,534,723 | 10/1970 | Tramontini | 123/142.5 R |
| 3,626,917 | 12/1971 | Tromel | 123/142.5 R |
| 3,687,122 | 8/1972 | Kamo | 123/122 G |

*Primary Examiner*—Charles J. Myhre
*Assistant Examiner*—R. H. Lazarus
*Attorney, Agent, or Firm*—Gary M. Gron; Robert T. Ruff

[57] ABSTRACT

A metering and control system is described for supplying fuel to a burner nozzle of a burner assembly which preheats intake air in a diesel engine. Fuel for the control system is derived from the regulated pressure output of a fuel pump in the engine fuel supply system. The fuel metering and control system includes a series of parallel flow lines connected between the fuel pump and the burner nozzle. Each line has a metering orifice and check valve set to pass flow above a given pressure level. For intermediate rpm flow is through one line and at high rpm flow is through both. As a result, the fuel flow rate into the burner nozzle is directly proportional to engine rpm to provide a uniform nozzle preheat temperature over the full range of engine rpm. Suitable control inputs are provided to initiate or terminate flow to the burner in response to selected engine operating parameters. In addition, supplemental fuel flow may be provided during start up and/or cold operating conditions, again initiated or terminated by selected engine operating parameters.

17 Claims, 3 Drawing Figures

DIESEL ENGINE INTAKE AIR PREHEATER FUEL CONTROL

The present invention relates to air intake preheaters for diesel engines. More specifically it relates to an improved control system for supplying fuel to a preheater that generates heat by combustion of fuel.

Air intake preheaters have been proposed and adopted for use in the air intake of diesel engines. One purpose of preheating is to permit prompt starting of the engine even at lower ambient temperatures. Another is the elimination of white smoke (unburned fuel in the exhaust) during certain engine operating conditions. Preheating is particularly advantageous for diesel engines with relatively low compression ratios operating under certain conditions. U.S. Pat. Nos. 3,526,214 and 3,687,122 disclose systems for preheating diesel engine intake air to provide the above benefits. There have been other systems proposed for the same purpose.

Generally these systems will comprise a burner positioned in the engine intake manifold. A fuel nozzle supplied from a fuel control system injects fuel into the burner. The injected fuel is mixed with air and the resultant combustible mixture ignited to increase the intake air temperature.

All of the known prior art burner fuel systems are designed for a fixed or very limited range of fuel flow rates. This rate gives an optimum temperature for a particular engine operating condition. Operation at other conditions, however, is a compromise. At each engine rpm there is a particular mass flow of air passing into the engine which must be heated at a given B.T.U. rate to achieve a selected temperature. Since the mass flow of intake air varies with speed there must be a variable rate of fuel flow to maintain a fixed temperature. In actual operation the range of required fuel flows may be as high as 8 to 1. Since prior art systems have at best only a limited flow range, most of the time they are operating at a compromise temperature. Attempts have been made to fully modulate fuel flow but they require fuel systems so expensive and complicated that they offset any performance benefit that might be gained.

The above ends in one aspect of the present invention are achieved by a fuel control system incorporated in a diesel engine air preheater fuel system of the above general type. The system receives fuel from the engine fuel system which has an increasing pressure output with increasing engine rpm. The system meters this fuel to produce a fuel flow into the burner that increases substantially linearly with an increase of engine rpm.

The above and other related features of the present invention will be apparent from a reading of the following description of the disclosure shown in the accompanying drawings and the novelty thereof pointed out in the appended claim.

Figure 1:
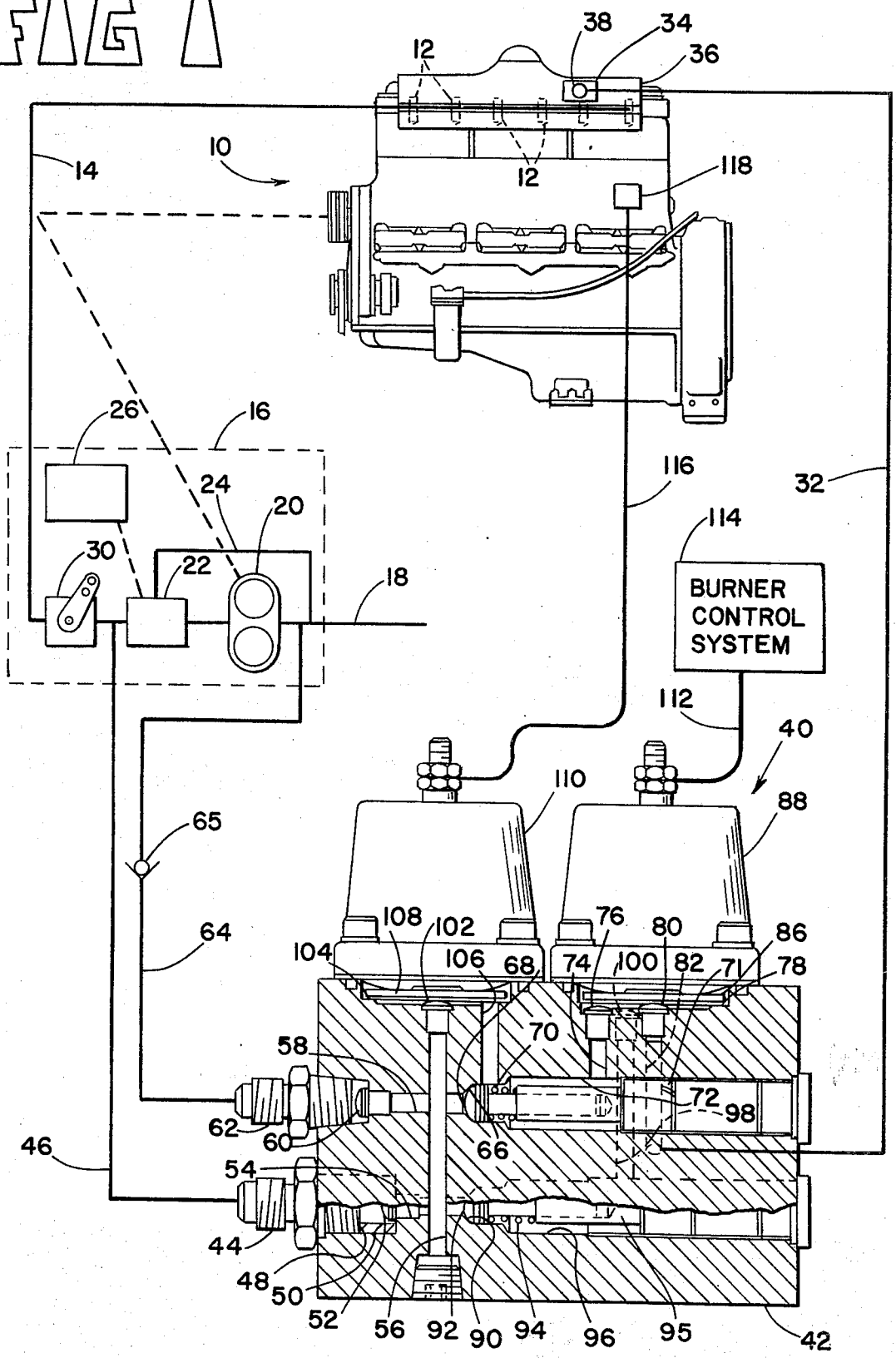
FIG. 1 is a schematic drawing of a diesel engine and an intake air preheating system incorporating a fuel metering system embodying the present invention.

FIG. 1 shows a compression ignition engine 10 with which the present invention may be used. Since its principles of operation are well known, the details of engine 10 will not be outlined to simplify the discussion of the present invention. For the present discussion it is enough to say engine 10 relies on the heat of compression to ignite fuel that is injected in timed sequence by fuel injectors 12. Injectors 12 are shown as a direct injection type in which a cam actuated plunger injects fuel at high pressure. Injectors 12 receive fuel from a fuel supply system 16 via a distribution conduit 14. Fuel system 16 receives fuel from a supply line 18 and pressurizes it for delivery to conduit 14. The fuel pressure to injectors 12 is controlled in accordance with the pressure-time relationships set forth in U.S. Pat. Nos. 2,727,503 and 2,749,897 to achieve a proper quantity of injected fuel to meet engine operating requirements.

Figure 2:
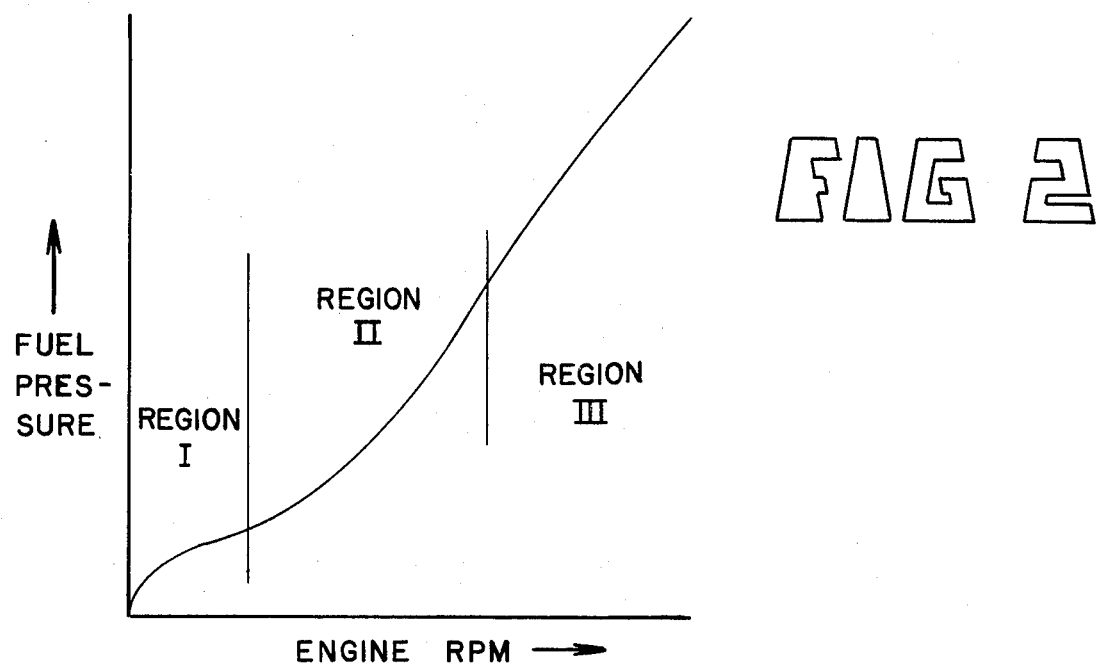
FIG. 2 is a graph of the pressure vs. rpm characteristics of the fuel source supplying fuel to the control system of FIG. 1.

The engine fuel system 16 includes a gear type engine driven pump 20 (note the mechanical connection) having its low pressure side connected to supply line 18 and feeding a governor controlled bypass valve 22. Valve 22 bypasses fuel from the high pressure side of pump 20 to the fuel supply 18 via a connection 24. Operation of valve 22 is controlled by a mechanical governor 26 to regulate the pressure output of pump 20 to a predetermined schedule of pressure vs. engine rpm as illustrated in FIG. 2. From that point, fuel passes to conduit 14 past an operator controlled throttle valve 30 for regulating flow to the injectors 12 in response to operator demand.

The engine 10 includes an intake manifold burner assembly 34 positioned in the intake manifold 36 or elsewhere in the air system for the engine 10. The burner assembly 34 has a nozzle 38 which injects fuel into the burner for mixing with intake air to produce a combustible mixture. A suitable device, such as a spark plug energized by a vibrator, initiates combustion of the mixture. This heats the air in the intake system of the engine 10 as a combustion aid.

The nozzle 38 is supplied with fuel from a supply line 32 connected to the engine fuel system 16 via a burner fuel control system generally indicated at 40. In accordance with the present invention, the burner fuel control system 40 meters fuel to nozzle 38 as a substantially linear function of engine rpm.

The burner fuel control system 40 comprises a housing 42 which conveniently may be made a part of the burner assembly 34 located on the engine manifold 36. Housing 42 has an inlet fitting 44 receiving fuel from conduit 46 which extends to the high pressure side of engine fuel pump 20. Inlet fitting 44 is received in a bore 48 containing an inlet filter screen 50 and a pressure reducing orifice 52. A port 54 extends from bore 48 to a passage 56 providing parallel flow paths through a number of circuits.

One flow path is through a port 58 in which a second pressure reducing orifice 60 is positioned. An outlet fitting 62 connects the low pressure side of orifice 60 to a conduit 64 leading to the low pressure fuel supply line 18 for pump 20. A check valve 65 maintains a minimum pressure in line 64.

An extension of port 58 leading from passage 56 begins a first main flow path and connects with a valve seat 66 having a one-way check valve plunger 68 urged against it by a spring 70. Spring 70 acts against an adjustable threaded stop 71 received in a chamber 72. When valve 68 is unseated, chamber 72 and a passage 74 are connected with passage 56. As later described, the preload of spring 70 is adjustably selected by stop 71 so that valve 68 unseats when the pressure in passage 56 is above a first predetermined level.

Passage 74 leads to a pressure reducing orifice 76 which opens into a recess 78. An additional pressure reducing orifice 80 connects recess 78 with a passage 82 leading nozzle supply conduit 32. Flow of fuel through orifice 80 to passage 82 is controlled by a valve plate 86 selectively displaced away from or toward orifice 80 by a solenoid valve assembly 88. Many suitable solenoid valve assemblies may be employed for this purpose. Components of the engine fuel shutdown solenoid (Part No.BM-69,973) manufactured by Cummins Engine Company, Inc., Columbus, Indiana has been found highly suited for this purpose.

A second main flow path extends from passage 56 through an extension of passage 54 terminating in a valve seat 90. A check valve plunger 92 is urged against it by a spring 94. Spring 94 acts on an adjustable threaded stop 95 positioned within a chamber 96. A pressure 98 extends from chamber 96 to a pressure reducing orifice 100 connected to recess 78. The preload of spring 94 is selected to permit one-way flow of fuel through chamber 96 to passage 98 when the pressure in passage 56 is above a second predetermined level.

Another flow path is provided from passage 56 by a pressure reducing orifice 102 connecting passage 56 with a recess 104. A passage 106 extends from recess 104 to chamber 72 downstream of check valve 68. Flow through recess 104 is controlled by a valve plate 108 selectively opening or closing orifice 102. Valve plate 108 is displaced by a solenoid valve assembly 110 similar to assembly 88.

Summarizing the above description, the first main flow path through the fuel control unit includes the extension of passage 58, valve seat 66, chamber 72, passage 74 and orifice 76. The second main flow path includes the extension of passage 54, valve seat 90, chamber 96, passage 98 and orifice 100. These flows recombine to pass through orifice 80.

Valve assemblies 88 and 110 are actuated by suitable electrical inputs to provide proper operation of the burner fuel control system. As illustrated solenoid valve assembly 88 may receive an electrical input permitting flow through orifice 80 via a wire 112 connected to the burner control system 114. This system energizes valve 88 to permit flow whenever burner assembly 34 is in operation. Thus, valve 88 functions as an on-off valve for the burner fuel control system 40. The burner control system 114 may be adapted to initiate combustion when certain indicated engine operating parameters reach levels requiring intake air heating. For example, the burner may be set to operate when engine output power is below a certain level or when intake air temperature is below a given level. Solenoid 110 is energized to permit flow past orifice 102 thus bypassing check valve 68 by a wire 116 connected to an engine block water temperature switch 118. Switch 118 turns on to maintain orifice 102 in an open condition when engine water temperature is below a given level.

The burner fuel control system 40 derives pressure from the output of engine fuel pump 20 via conduit 46. Thus, the input pressure to the burner fuel control system varies as a function of engine rpm. This pressure however is at a level that is too high for proper utilization by nozzle 38. The pressure reducing orifices 52 and 60 provide in effect a pressure divider circuit in which flow passes through orifice 52, passage 56, orifice 60 and check valve 65 to the low pressure engine fuel supply line 18. The net effect of this circuit is to provide a pressure in passage 56 that substantially follows the pressure characteristic of the regulated engine fuel pump output shown in FIG. 2 but at a substantially lower absolute level. For extremely low pressure output from pump 20, check valve 65 provides a lower limit to the pressure in passages 64 and 56 for positive control of minimum fuel rates.

During operation of the engine 10, the function of the burner fuel control system may be divided in to three rpm regions as follows:
 I. Start up
 II. Idle and intermediate engine rpm
 III. High rpm
These regions are identified as such on the pressure vs. rpm graph of FIGS. 2 and 3.

As stated above one object of the fuel control system 40 is to provide fuel to nozzle 38 at a flow rate that has a substantially linear relationship to engine rpm. Regions II and III represent the normal rpm operating range of engine 10. It should be noted that in region II the pressure/rpm curve has an approximate parabolic shape. The opening pressure for check valve 68 is set at a pressure which provides a desired fuel rate at the lowest engine speed of region II. Therefore, fuel will normally pass through the first flow path in fuel control 40 when pressure is at a level experienced in region II. When check valve 68 permits flow, fuel passes through orifice 76 which has a fixed cross sectional flow area. The fuel flow through orifice 76 is a function of certain flow coefficients and the square root of the pressure drop across the orifice. Since the parabolic pressure/rpm curve means that the pressure increases as a function of the square of rpm, the flow through orifice 76 is metered as a linear function of rpm (shown in FIG. 3). Check valve 68 operates such that during normal engine operation, flow through orifice 76 is not a function of the pressure/rpm relationships of region I.

Figure 3:
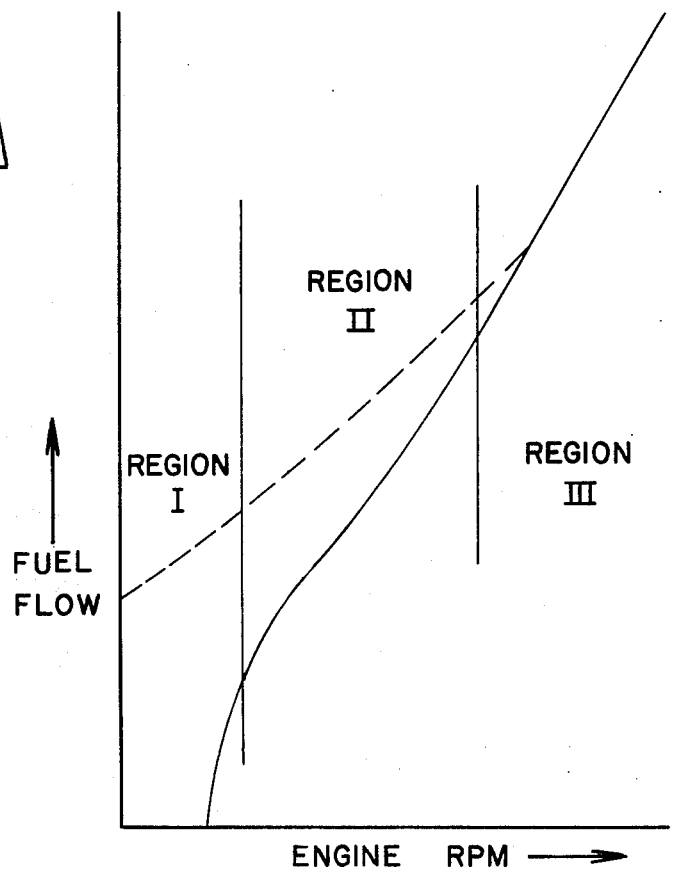
FIG. 3 is a graph of the fuel flow rate delivered by the control system of FIG. 1 as a function of engine rpm.

In region III the pressure output of the pump 20 ceases to increase at the parabolic rate. Furthermore, the pressure in the engine intake manifold 36 for a turbocharged engine will start to increase to a point where the pressure differential reflected back to orifice 76 will begin to lower the rate of burner fuel flow increase from the desired rate. At the pressure level beginning region III, the check valve 92 opens to permit flow through the second main flow path thereby providing an additional flow path for fuel to line 32. The sizes of orifices 76 and 100 are selected so that they in effect perform the flow metering function for the fuel control system 40 by passing flow through orifice 100 in addition to orifice 76. The total flow orifice area thus is increased to permit an increase in flow to achieve linear flow relationship as shown in FIG. 3 even though pressure is not increasing at the parabolic rate of region II. The opening points of check valves 68 and 92 may be selected by manipulating adjustable stops 71 and 95 respectively and orifices may be sized to tailor the flow/rpm characteristic for particular engine fuel system and engine combinations.

As stated above, region I is the point below which fuel is not permitted to flow by check valve 68. It is frequently necessary for fuel to be passed to the burner nozzle 38 during engine cranking to enable rapid start up. To permit flow in region I, the solenoid valve 110 is energized to open orifice 102 and permit flow of fuel around check valve 68 thus disabling it. This provides sufficient flow to nozzle 38 to permit heating of intake air to a point permitting prompt start up. Furthermore, additional flow over and above that scheduled by the fuel system in region II or even region III is required when the engine block is cold as shown by the dashed fuel flow curve in FIG. 3. The reason is that the cold engine parts tend to absorb much of the heat generated by the burner thereby lowering the desired temperature increase. The additional flow of fuel is permitted by the solenoid 110 as long as the engine block temperature switch 118 permits opening of the valve. Once the engine block temperature is above the level permitting normal operation the solenoid valve will close the circuit and permit the system to function in its normal manner.

The above burner fuel control system produces a fuel flow output for a warm engine that is substantially a linear function of engine rpm as illustrated in FIG. 3. In addition, provision for additional fuel to the burner is provided when cold engine parts would reduce the temperature of air supplied to the cylinders. This insures that when burner operation is initiated the cylinder intake air temperature will be at a given preselected level irrespective of the engine rpm. In other words, the above system has no off design point during which efficient operation is comprised. Furthermore, the system is extremely simplified utilizing readily available components. The adjustable opening pressure feature of the check valve and easy sizing of orifices permits the system to satisfy a wide range of individual engine requirements.

While a preferred embodiment of the present invention has been discussed, those skilled in the art may employ different arrangements without departing from its spirit and scope.

Having thus described the invention, what is claimed as novel and desired to be secured by Letters Patent of the United States is:

1. In a compression ignition engine having a system including a first flow path means for supplying fuel to said engine at a pressure varying as a non linear function of engine RPM, a preheater system comprising a burner receiving intake air for said engine and a nozzle positioned in said burner for injecting fuel from a second flow path means into said burner for combustion with said air, the improvement comprising:
  means interposed between and connecting said second flow path means of said fuel supply system with said nozzle for metering fuel to said nozzle at a fuel flow rate substantially linearly increasing with an increase in engine rpm over the range of normal engine operating rpm.

2. Apparatus as in claim 1 wherein said fuel supply system has a pressure vs. rpm relationship comprising a first region at low rpm having a steep relatively linear curve and a second region at an rpm above and adjacent said first region, said second region having a generally parabolic curve, and wherein said fuel metering means comprises:
  means for defining a flow path through said fuel metering means;
  means for permitting flow through said flow path only when the upstream pressure of said fuel metering means is above that of said first region; and,
  means defining a fixed orifice in series flow relation to said flow permitting means whereby fuel metered to said nozzle is substantially a linear function of rpm in said second region.

3. Apparatus as in claim 2 wherein said flow permitting means comprises a check valve only permitting flow in a downstream direction when the upstream pressure exceeds said given level.

4. Apparatus as in claim 3 wherein said pressure vs. rpm relationship of said fuel supply system comprises a third region of a relatively high engine rpm and having a curve increasing at a generally linear rate substantially less than the parabolic rate of said second region and wherein said fuel metering system further comprises means for providing an additional metering flow path for pressure levels above said second region thereby providing substantially a linear relationship between flow and rpm for said third region.

5. Apparatus as in claim 4 wherein said additional metering flow path means comprises:
  means for defining a second flow path through said fuel metering means in parallel flow relation to said first flow path; and,
  a second check valve in said second flow path for permitting fuel flow in parallel with said first check valve only when the upstream pressure exceeds the pressure level at the beginning of said third region; and,
  a fixed orifice in series flow relation to said second check valve whereby when said second check valve opens the effective metering area of said system is increased to produce a substantially linear relationship of flow vs. rpm in said third region.

6. Apparatus as in claim 1 wherein the pressure level of said engine fuel system is substantially greater than a level usable by said fuel metering system and wherein said metering means further comprises:
  means for defining a pressure reducing flow path from said second flow path means of said engine fuel system to a low pressure point; and,
  means for defining a pair of pressure reducing orifices in series flow relation in said pressure reducing flow path; and,
  means for defining a supply flow path to said fuel metering means from a point between said orifices whereby the pressure level is substantially reduced.

7. Apparatus as in claim 6 wherein said fuel supply system has a pressure vs. rpm relationship comprising a first region at low rpm having steep relatively linear curve and a second region at an rpm above and adjacent said first region, said second region having a generally parabolic curve and wherein said fuel metering means comprises:
  means for defining a first flow path through said fuel metering means;
  means for permitting flow through said flow path only when the upstream pressure of said fuel metering means is above that of said first region; and,
  means defining a fixed orifice in series flow relation to said check valve whereby fuel metered to said nozzle is substantially a linear function of rpm in said second region.

8. Apparatus as in claim 7 wherein said flow permitting means comprises a check valve only permitting flow in a downstream direction when the upstream pressure exceeds said given level.

9. Apparatus as in claim 8 wherein said pressure vs. rpm relationship of said fuel supply system comprises a third region of a relatively high engine rpm and having a curve increasing at a generally linear rate substantially less than the parabolic rate of said second region and wherein said fuel metering system further comprises:
- means for defining a second flow path through said fuel metering means in parallel flow relation to said first flow path;
- a second check valve in said second flow path for permitting fuel flow in parallel with said first check valve only when the upstream pressure exceeds the level at the beginning of said third region; and,
- a fixed orifice in series flow relation to said second check valve whereby when said second check valve opens the effective metering area of said system is increased to produce a substantially linear relationship of flow vs. rpm in said third region.

10. Apparatus as in claim 2 wherein the pressure level in said first region is insufficient for proper nozzle flow during start up of an engine and said fuel metering system further comprises means for bypassing flow around said flow permitting means thereby permitting fuel flow to pass to said burner.

11. Apparatus as in claim 10 wherein:
- said flow permitting means comprises a check valve permitting flow through said first flow path in a downstream direction; and,
- said bypassing means comprises a valve selectively operable to establish an alternate flow path in parallel flow relation to the flow path through said first check valve.

12. Apparatus as in claim 11 wherein said valve is solenoid operated.

13. Apparatus as in claim 12 wherein said solenoid operated valve is responsive to the water temperature of said engine for permitting flow through said alternate flow path when the engine water temperature is below a predetermined level.

14. Apparatus as in claim 1 further comprising a valve in series flow relation to said metering means for selectively permitting flow to said nozzle only when said burner is in operation.

15. Apparatus as in claim 14 wherein said valve is solenoid operated.

16. Apparatus as in claim 1 wherein the pressure output of said engine fuel supply system is at a level substantially greater than that usable by said fuel metering system and wherein said apparatus further comprises:
- means for providing a pressure reducing flow path for fuel from said fuel supply system to a low pressure point;
- means defining a pair of metering orifices in series flow relation in said pressure reducing flow path;
- means providing a supply flow path from a point intermediate said orifice forming means to said fuel metering means; and,
- a check valve in series flow relation and downstream of said orifices, said check valve having a predetermined opening point for maintaining a minimum pressure in said fuel metering system.

17. Apparatus as in claim 9 wherein the pressure levels at which said check valves pass fuel are adjustable for adjusting the flow vs. rpm characteristic of said fuel metering means.

* * * * *